United States Patent
Inoue et al.

(10) Patent No.: US 8,523,596 B2
(45) Date of Patent: Sep. 3, 2013

(54) POWER PLUG LOCKING DEVICE

(75) Inventors: Tomohiro Inoue, Aichi (JP); Shuji Ogata, Aichi (JP); Keigo Nishimoto, Aichi (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 39 days.

(21) Appl. No.: 13/413,025

(22) Filed: Mar. 6, 2012

(65) Prior Publication Data
US 2012/0234061 A1     Sep. 20, 2012

(30) Foreign Application Priority Data

Mar. 18, 2011  (JP) ................... 2011-061096
Sep. 21, 2011  (JP) ................... 2011-206271

(51) Int. Cl.
*H01R 13/627* (2006.01)

(52) U.S. Cl.
USPC .......................................... 439/352; 439/310

(58) Field of Classification Search
USPC ............ 320/108, 109, 111; 70/255; 439/34, 439/352, 310
See application file for complete search history.

(56) References Cited

U.S. PATENT DOCUMENTS

| 8,206,172 | B2 * | 6/2012 | Katagiri et al. | 439/352 |
| 8,317,534 | B2 * | 11/2012 | Osawa et al. | 439/353 |
| 8,357,001 | B2 * | 1/2013 | Katagiri et al. | 439/304 |
| 2012/0234061 | A1 * | 9/2012 | Inoue et al. | 70/255 |

FOREIGN PATENT DOCUMENTS

| JP | 09-161898 | 6/1997 |
| JP | 2009-008917 | 1/2009 |

* cited by examiner

*Primary Examiner* — James Harvey
(74) *Attorney, Agent, or Firm* — Greenblum & Bernstein P.L.C.

(57) ABSTRACT

A power plug locking device used with a door lock drive source that locks a vehicle door includes a lock mechanism switched between a lock state, in which removal of a power plug from an inlet is prohibited, and an unlock state, in which the removal is permitted. A plug lock drive source performs an unlocking operation that switches the lock mechanism to the unlock state. A plug lock detector, which detects whether the lock mechanism is in the lock state, is connected between the plug lock drive source and an unlock terminal of the door lock drive source. A power supply circuit supplies the plug lock drive source with current and switches the lock mechanism to the unlock state when the door lock drive source is performing an unlocking operation while the plug lock detector is detecting that the lock mechanism is in the lock state.

13 Claims, 13 Drawing Sheets

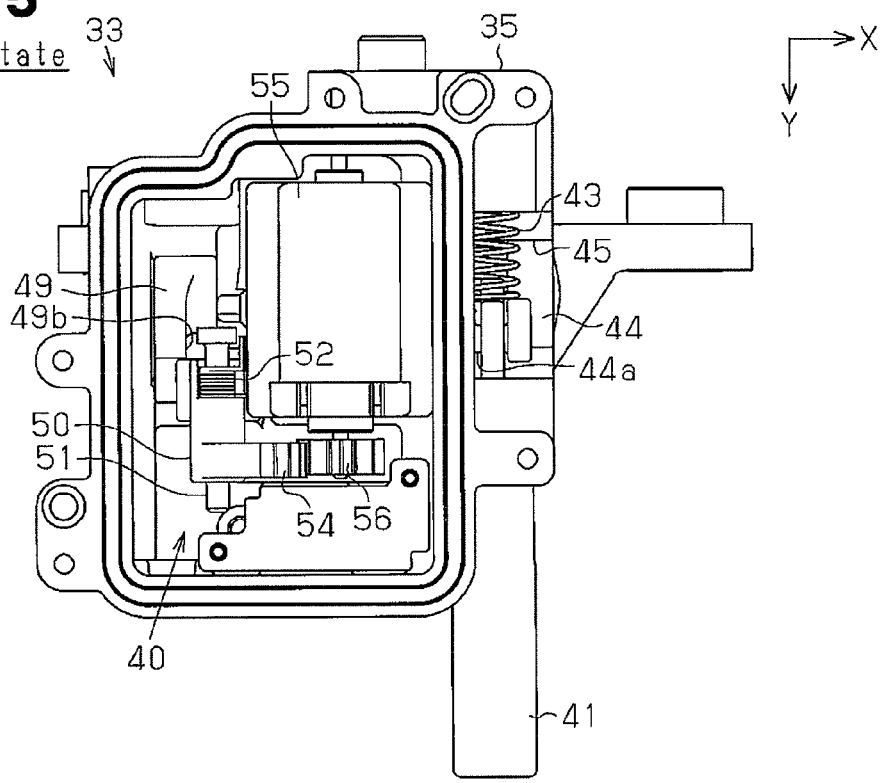
Fig.5 Unlock State
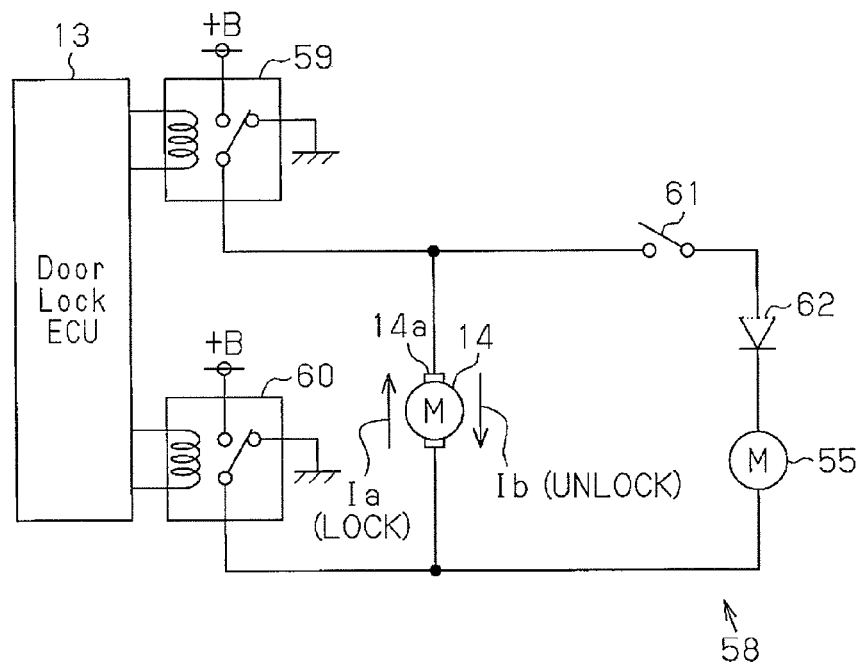
Fig.6

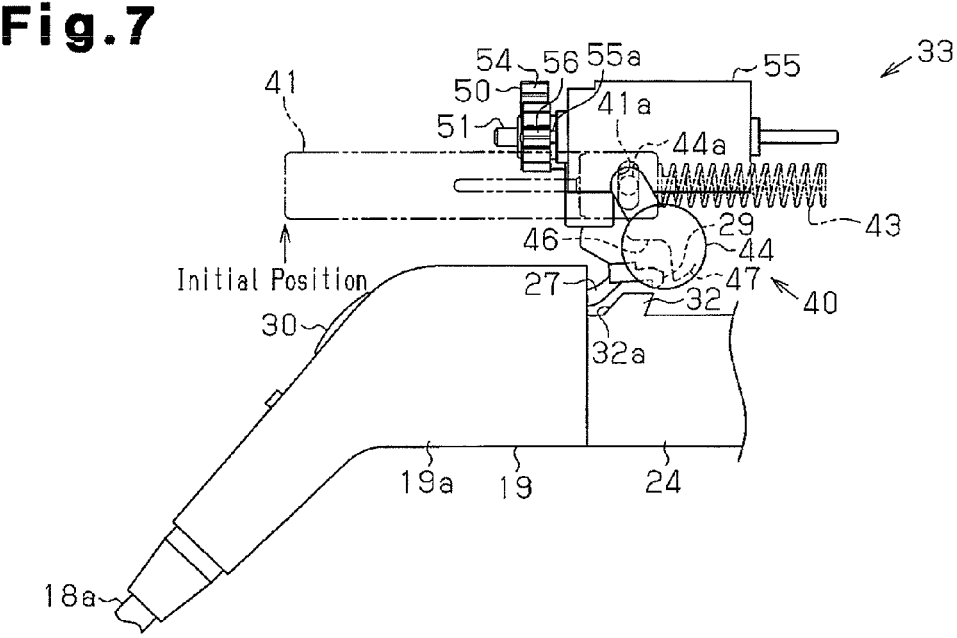
Fig.7
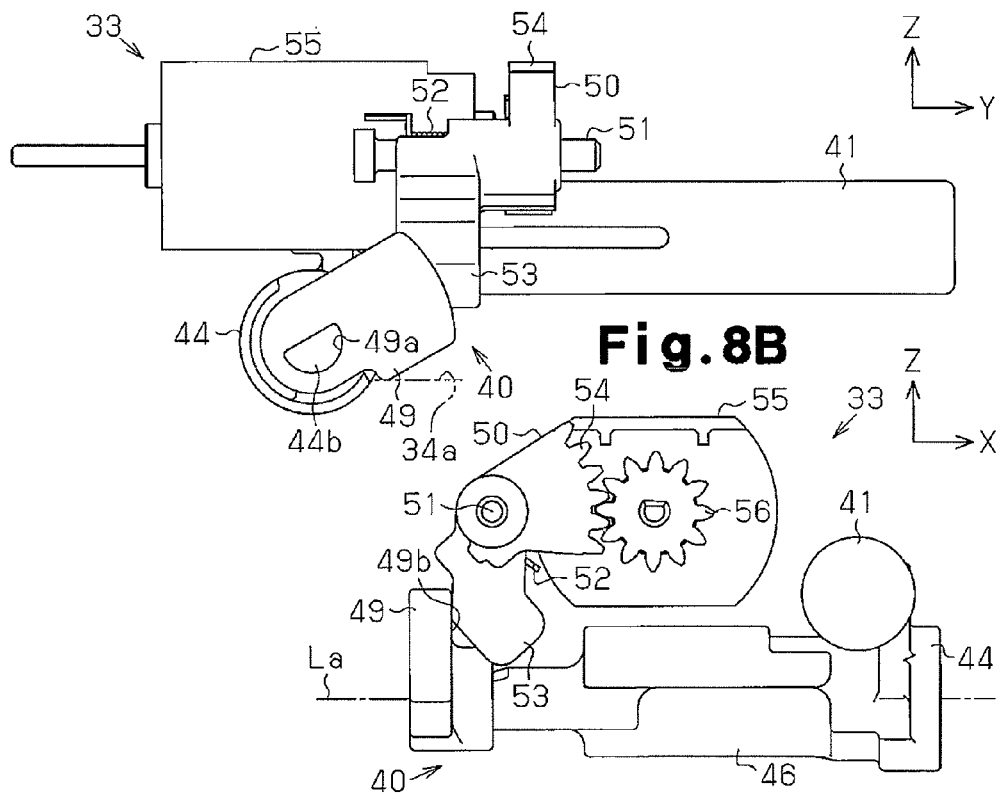
Fig.8A
Fig.8B

| Door | Plug Lock Detector 61 | Vin1 | Vin2 | Vout | Power Plug Unlock Motor 55 |
|---|---|---|---|---|---|
| Lock Operation | ON | L | H | L | - |
|  | OFF | L | L | L | - |
| Unlock Operation | ON | H | H | H | Unlock Operation |
|  | OFF | H | L | L | - |
| Stop | ON | L | H | L | - |
|  | OFF | L | L | L | - | ary patent Publication No. 9-161898).
POWER PLUG LOCKING DEVICE

CROSS-REFERENCE TO RELATED APPLICATIONS

This application is based upon and claims the benefit of priority from prior Japanese Patent Application Nos. 2011-061096, filed on Mar. 18, 2011, and 2011-206271, filed on Sep. 21, 2011, the entire contents of which are incorporated herein by reference.

BACKGROUND OF THE INVENTION

The present invention relates to a power plug locking device that prevents unauthorized removal of a power plug from an object such as a vehicle.

Hybrid vehicles and electric vehicles are driven by motors, which are powered by batteries. A power plug is used to charge such a battery (refer to Japanese Laid-Open Patent Publication No. 9-161898).

The charging of a battery for a motor-driven vehicle takes a long time compared to when refueling a vehicle with liquid fuel such as gasoline. Hence, it is desirable for a power plug locking device to prevent unauthorized removal of the power plug from a vehicle.

Japanese Laid-Open Patent Publication No. 2009-08917 describes a power plug locking device that locks and unlocks a power plug in cooperation with the locking and unlocking of a vehicle door. In this power plug locking device, the power plug locking device performs locking and unlocking operations even when the power plug is not connected to the vehicle. Such operations are unnecessary and may shorten the duration of the power plug locking device.

SUMMARY OF THE INVENTION

One aspect of the present invention is a power plug locking device for use with a door lock drive source that locks a door of a vehicle. The power plug locking device includes a lock mechanism switched between a lock state, in which the lock mechanism prohibits removal of a power plug from an inlet, and an unlock state, in which the lock mechanism permits removal of the power plug from the inlet. A plug lock drive source performs at least an unlocking operation that switches the lock mechanism from the lock state to the unlock state. A plug lock detector detects whether or not the lock mechanism is in the lock state. The plug lock detector is connected between the plug lock drive source and an unlock terminal, which has a high potential when the door is unlocked and which is one of a plurality of terminals of the door lock drive source. A power supply circuit supplies the plug lock drive source with current and switches the lock mechanism from the lock state to the unlock state only when the door lock drive source is performing an unlocking operation while the plug lock detector is detecting that the lock mechanism is in the lock state.

A further aspect of the present invention is a power plug locking device that functions in a plug lock state, in which the power plug locking device prohibits removal of a power plug from an inlet, and a plug unlock state, in which the power plug locking device permits removal of the power plug from the inlet. The power plug locking device is used with a door lock motor and performs a door locking operation when supplied with a lock current and a door unlocking operation when supplied with an unlock current. The power plug locking device includes a relay connected to the door lock motor. The relay switches the lock current and the unlock current. A plug unlock motor is connected in parallel to the door lock motor. The plug unlock motor performs a plug unlocking operation in cooperation with the door unlocking operation of the door lock motor. A switch is arranged between the relay and the plug unlock motor. The switch starts and stops supplying the unlock current from the relay to the plug unlock motor. The switch is activated in the plug lock state to supply the unlock current to the plug unlock motor and deactivated in the plug unlock state to stop supplying the unlock current to the plug unlock motor.

Another aspect of the present invention is a power plug locking device that functions in a plug lock state, in which the power plug locking device prohibits removal of a power plug from an inlet, and a plug unlock state, in which the power plug locking device permits removal of the power plug from the inlet. The power plug locking device is used with a door lock motor and performs a door locking operation when supplied with a lock current and a door unlocking operation when supplied with an unlock current. The power plug locking device includes a plug unlock motor that performs a plug unlocking operation when supplied with a drive current that differs from the lock current and the unlock current. A relay is connected to the door lock motor. The relay switches the lock current and the unlock current. A switch is activated in the plug lock state and deactivated in the plug unlock state. An AND circuit includes input terminals, which are connected to the switch and a node between the relay and the door lock motor, and an output terminal, which is connected to the plug unlock motor. The AND circuit supplies the drive current to the plug unlock motor from the output terminal when the unlock current is supplied to the door lock motor in the plug lock state and otherwise supplies the drive current to the plug unlock motor from the output terminal.

A further aspect of the present invention is a power plug locking device that functions in a plug lock state, in which the power plug locking device prohibits removal of a power plug from an inlet, and a plug unlock state, in which the power plug locking device permits removal of the power plug from the inlet. The power plug locking device is used with a door lock motor and performs a door locking operation when supplied with a lock current and a door unlocking operation when supplied with an unlock current. The power plug locking device includes a plug unlock motor that performs a plug unlocking operation when supplied with a drive current that differs from the lock current and the unlock current. A relay is connected to the door lock motor. The relay switches the lock current and the unlock current. A switch is activated in the plug lock state and deactivated in the plug unlock state. The switch is connected to a node between the relay and the door lock motor. A switch circuit includes an input terminal, which is connected to the switch, and an output terminal, which is connected to the plug unlock motor. The switch circuit supplies the drive current to the plug unlock motor from the output terminal when the unlock current is supplied to the door lock motor in the plug lock state and otherwise supplies the drive current to the plug unlock motor from the output terminal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a plan view showing the power plug locking device;

FIG. 6 is a circuit diagram showing the electrical configuration of the power plug locking device;

FIG. 7 is a side view showing the power plug locking device in an unlock state;

FIG. 8A is a side view showing the power plug locking device in the unlock state;

FIG. 8B is a front view showing the power plug locking device in the unlock state;

DETAILED DESCRIPTION OF THE EMBODIMENTS

A first embodiment of the present invention will now be described with reference to FIGS. 1 to 13.

Figure 1:
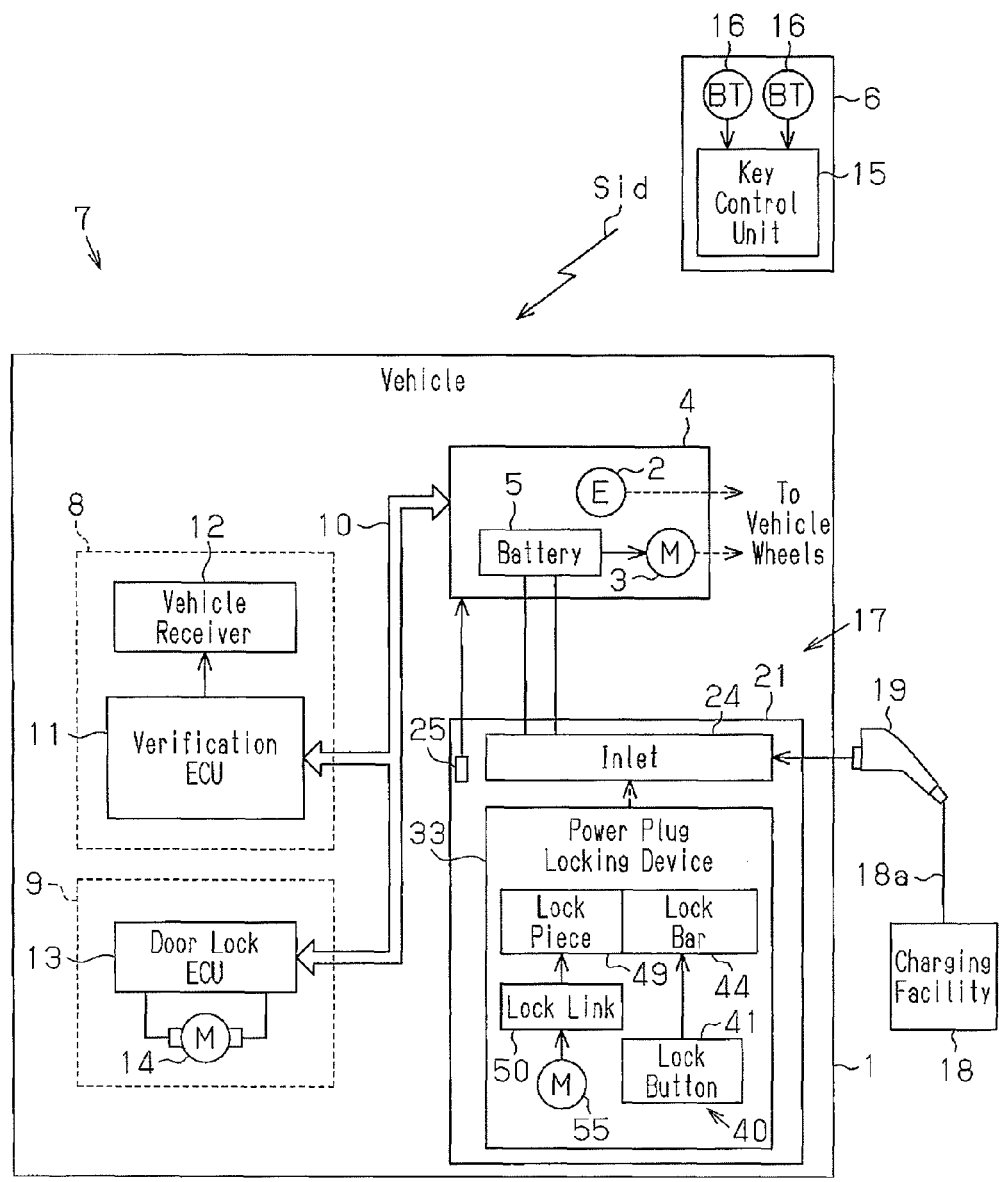
FIG. 1 is a schematic diagram of a vehicle in a first embodiment of the present invention.

Referring to FIG. 1, a hybrid vehicle 1 includes an engine 2 and a motor 3, which form a hybrid system 4 and generate power to rotate vehicle wheels. The hybrid system 4 includes a battery 5, which serves as a power source for the motor 3. The vehicle 1 is driven in various modes, such as a mode that drives the vehicle 1 with the power of both the engine 2 and the motor 3 and a mode that drives the vehicle 1 with the power of only the motor 3.

An electronic key system 7 is installed in the vehicle 1 to perform ID verification through wireless communication with an electronic key 6 and then actuate the vehicle 1. The electronic key system 7 of the present example is a wireless key system that starts ID verification upon establishment of communication with the electronic key 6.

The vehicle 1 includes a key verification device 8, which verifies the ID of the electronic key 6, and a door locking device 9, which locks and unlocks a vehicle door. The hybrid system 4, the key verification device 8, and the door locking device 9 are connected to an in-vehicle bus 10. The key verification device 8 includes a verification electronic control unit (ECU), which controls the key verification device 8. The verification ECU 11 includes a memory in which an ID code of the electronic key 6 is registered. A vehicle receiver 12, which receives radio waves in an ultrahigh frequency (UHF) band, is connected to the verification ECU 11. The door locking device 9 includes a door lock ECU 13, which controls the locking and unlocking of the vehicle door. A door lock motor 14, which serves as a drive source, locks and unlocks the vehicle door. The door lock motor 14 is connected to the door lock ECU 13 and corresponds to a door lock drive source.

The electronic key 6 includes a key control unit 15, which manages the communication operation of the electronic key 6. The key control unit 15 includes a memory in which an ID code of the electronic key 6 is registered. The electronic key 6 includes a plurality of buttons 16, which are manually operated to have the vehicle 1 perform an action through remote control. The buttons 16 include a lock button, which locks the vehicle door, and an unlock button, which unlocks the vehicle door.

When one of the buttons 16 is operated, the electronic key 6 transmits a wireless signal Sid on a radio wave in the UHF band. The wireless signal Sid includes the ID code of the electronic key 6 and a functional code corresponding to operated button 16. The verification ECU 11 receives the wireless signal Sid with the vehicle receiver 12 and verifies the ID code in the wireless signal Sid. When ID verification is accomplished, the verification ECU 11 has the vehicle perform an action that is in accordance with the functional code in the wireless signal Sid.

For instance, when the vehicle door is locked, a door lock request signal, which is a wireless signal Sid, is received from the electronic key 6, and ID verification is accomplished, the electronic key system 7 has the door lock motor 14 produce, for example, forward rotation to lock a frame (not shown) of the vehicle door with a locking member (not shown). This locks the vehicle door. In contrast, when the vehicle door is unlocked, a door unlock request signal, which is a wireless signal Sid, is received from the electronic key 6, and ID verification is accomplished, the electronic key system 7 has the door lock motor 14 produce reverse rotation to remove the locking member from the frame of the vehicle door.

The vehicle 1 includes a charge system 17 that charges the battery 5 with an external power supply. When connected to a power plug 19, the charge system 17 charges the battery 5. The power plug 19 is arranged on a distal end of a charge cable 18a, which is connected to a charging facility, such as a charging station or a residential power outlet.

The power plug 19 is fitted to a power reception connector 21, which is arranged, for example, in a left side wall of a vehicle body 20. The power reception connector 21 is accommodated in an accommodation compartment 23. A lid 22 opens and closes the accommodation compartment 23. The power reception connector 21 is provided with an inlet 24, which includes electrical connection terminals (e.g., power terminal and control terminal). A cap 26, which is made of an insulating material and covers the electrical connection terminals, is attached to the inlet 24.

Figure 2:
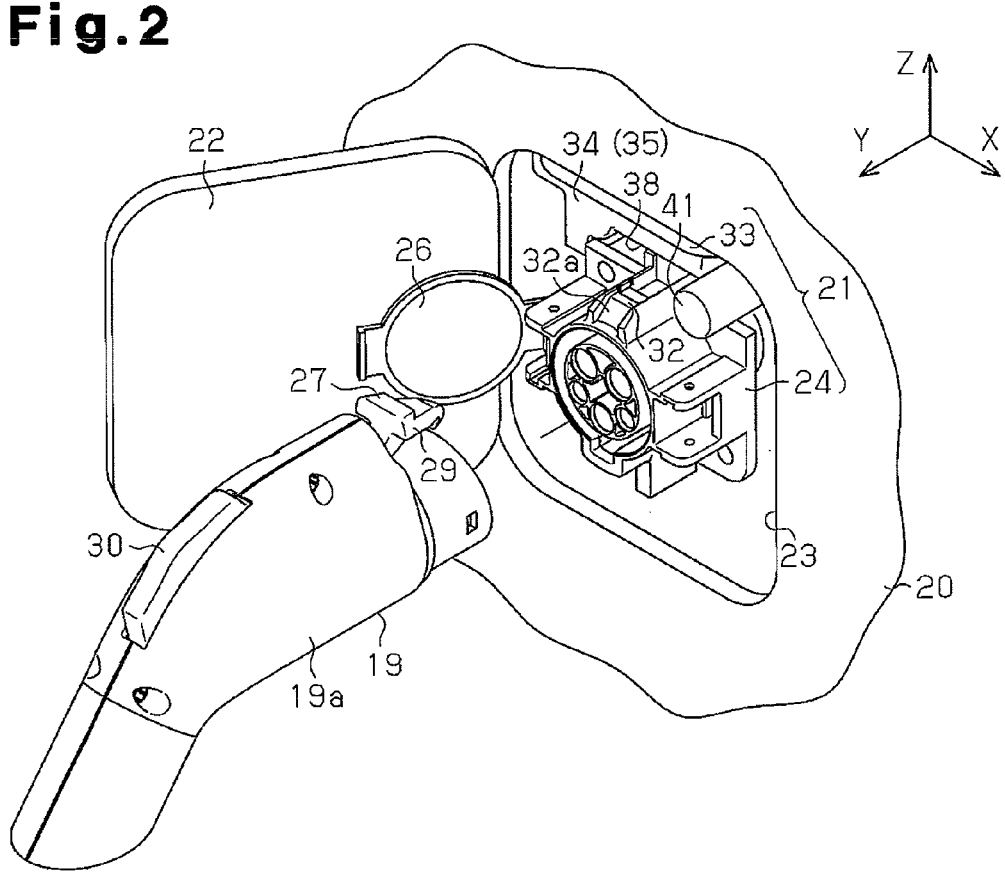
FIG. 2 is a perspective view showing a power plug and an inlet.
Figure 3:
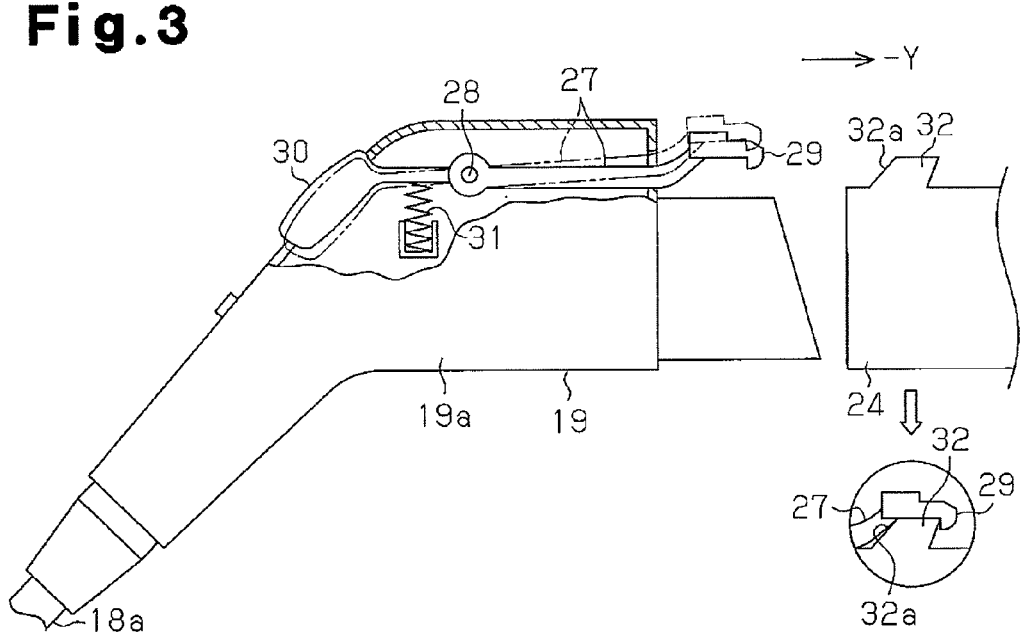
FIG. 3 is a side view, partially in cross-section, showing the structure of the power plug and how the power plug is connected to the vehicle.

Referring to FIGS. 2 and 3, the power plug 19 includes electrical connection terminals corresponding to the electric connection terminals of the inlet 24. The power plug 19 includes a plug body 19a and a lock arm 27, which is pivotally coupled to the plug body 19a. A pivot shaft 28 pivotally supports the lock arm 27. The lock arm 27 includes a distal portion defining a hook 29 and a basal portion defining a lever 30. The hook 29 and lever 30 are exposed from the plug body 19a. An urging member 31 constantly urges the lock arm 27 to force the hook 29 in a closing direction.

To connect the power plug 19 to the inlet 24, the power plug 19 is fitted straight in an insertion direction (−Y axis direction of FIG. 3) into the inlet 24. This guides and raises the hook 29 along a sloped surface 32a of a projection 32 on the inlet 24. When the plug 19 is completely fitted to the inlet 24, the urging force of the urging member 31 pivots the lock arm 27 and hooks the hook 29 to the projection 32. This prevents separation of the power plug 19 from the inlet 24.

When a plug connection detection sensor 25 (FIG. 1) detects that the power plug 19 is completely fitted to the inlet 24, the hybrid system 4 sends a charge start request to the power plug 19. In response to the charge start request from the hybrid system 4, the power plug 19 starts supplying current to the power reception connector 21 and charges the battery 5. When determining that the battery 5 has been fully charged, the hybrid system 4 sends a charge end request to the power plug 19. In response to the charge end request from the hybrid system 4, the power reception connector 21 stops supplying current to the power reception connector 21.

Figure 4:
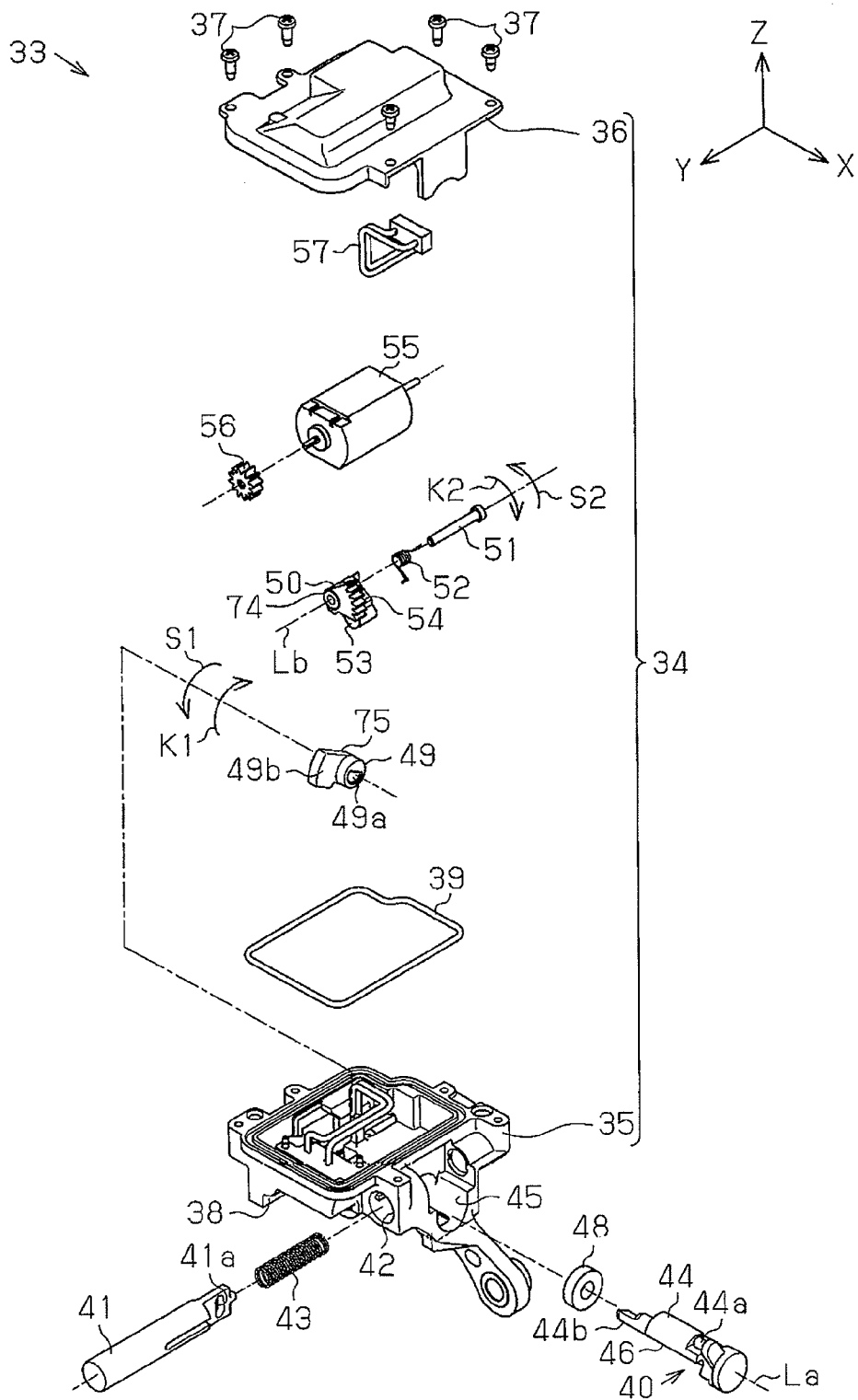
FIG. 4 is an exploded perspective view showing a power plug locking device.

Referring to FIGS. 4 and 5, the power reception connector 21 includes a power plug locking device 33, which prevents unauthorized removal of the power plug 19 from the inlet 24. The power plug locking device 33 is manually operated and switched from a plug unlock state to a plug lock state. A mechanical structure holds the power plug locking device 33 in a plug lock state. The power plug locking device 33 switches from the plug lock state to the plug unlock state, for example, in cooperation with the unlocking of the vehicle door.

The power plug locking device 33 includes a case 34, which is box-shaped and has a low profile. The case 34 includes a lock body 35 and a lid 36, which is generally plate-shaped and coupled to the lock body 35. Fasteners 37, such as screws, fasten the lid 36 to the lock body 35. This defines an accommodation compartment that accommodates a lock mechanism 40 in the case 34. The case 34 has an outer surface including a recess 38, which receives the hook 29 of the lock arm 27. The lock body 35 of the case 34 is fixed to the inlet 24 by a hooking member (not shown).

A seal 39 is arranged between the lock body 35 and the lid 36 to seal the accommodation compartment in the case 34. The seal 39 is a water resistant seal such as an O-ring.

The lock mechanism 40 is formed by various mechanical components including a drive source. The lock body 35 includes a button guide hole 42. A cylindrical lock button 41 is coupled to the button guide hole 42 and manually operated to switch the lock mechanism 40 to a plug lock state. The lock button 41 is movable back and forth in the Y axis as viewed in FIG. 4. The lock button 41 includes a basal end arranged in the button guide hole 42 and a distal end exposed from the lock body 35. An urging member 43 is arranged between the basal end of the lock button 41 and the bottom surface of the button guide hole 42 to constantly urge the distal end of the lock button 41 outward from the lock body 35. The urging member 43 is, for example, a coil spring.

A cylindrical lock bar 44, which locks the lock arm 27, is pivotally coupled to the lock mechanism 40. The lock body 35 includes a lock bar guide hole 45, which receives the lock bar 44. The lock bar 44 has an axis La, which is parallel to the X-axis as viewed in FIG. 4, and is rotatable about the axis La. In the illustrated example, the axis La of the lock bar 44 is perpendicular to the axis of the lock button 41. A tab extends from a side surface of the lock bar 44. The tab includes a pin 44a, which extends parallel to the axis La. The lock bar 44 includes an elongated hole 41a, which receives the pin 44a. When the lock bar 44 moves straight along the Y axis to a retracted position, the pin 44a is moved in the elongated hole 41a thereby rotating the lock bar 44 around the axis La.

A notch 46 extends along the axis La in part of a side surface of the lock bar 44. In the example of FIG. 7, the notch 46 is open to an extent of about 90 degrees in the circumferential direction of the lock bar 44. When a circumferential surface 47 of the lock bar 44, which is defined by the side surface excluding the notch 46, is arranged on the lock arm 27, the lock bar 44 fixes the lock arm 27 to the inlet 24. When the notch 46 is located above the lock arm 27, the lock bar 44 permits pivoting of the lock bar 44.

An annular seal 48 is arranged between the lock bar 44 and the lock bar guide hole 45 to seal the accommodation compartment in the case 34. The seal 48 is a water resistant seal such as a lip seal.

The lock bar 44 includes a basal end 44b fixed to a lock piece 49. The lock piece 49 includes a D-shaped hole 49a, which extends along the axis La of the lock bar 44, and a plate 49b, which extends perpendicular to the axis La of the lock bar 44. The basal end 44b of the lock bar 44 is fitted into the D-shaped hole 49a of the lock piece 49. Accordingly, the lock piece 49 is pivoted integrally with the lock bar 44. When the lock bar 44 is pushed and moved to the retracted position, the lock piece 49 rotates in a lock direction K1 together with the lock bar 44. Movement of the lock button 41 from the retracted position to an initial position (projected position) rotates the lock piece 49 together with the lock bar 44 in the unlock direction S1.

A lock link 50 is arranged in the case 34. The lock link 50 holds the lock bar 44 at a lock position in cooperation with a lock piece 49. The lock link 50 is supported by a pin 51 having an axis Lb, which is parallel to the Y-axis. The lock link 50 pivots about the axis Lb of the pin 51 in a lock direction K2 and an unlock direction S2, which intersect the pivoting direction of the lock piece 49. The urging member 52 constantly urges the lock link 50 in the lock direction K2. The urging member 52 is, for example, a torsion spring.

The lock link 50 includes a restriction plate 53, which restricts pivoting of the lock piece 49 in the unlock direction S1 resulting from the urging force of the urging member 43. When the lock piece 49 pivots in the lock direction K1, the lock piece 49 moves away from the restriction plate 53 of the lock piece 49, and the urging force of the urging member 52 rotates the lock link 50 in the lock direction K2. In this state, the restriction plate 53 is located between the lock piece 49 and the case 34. Accordingly, rotation of the lock piece 49 in the unlock direction S1 is prohibited, and the lock bar 44 is maintained in a lock state.

The lock link 50 includes a gear 54, which is separated from the restriction plate 53 in a direction parallel to the axis Lb of the pin 51. The gear 54 includes teeth arranged in the rotation directions S2 and K2 of the lock link 50. The gear 54 is connected to a power plug unlock motor 55, which serves as a drive source that returns the lock bar 44 from a lock state to an unlock state. A gear 56, which is fixed to a motor shaft of the power plug unlock motor 55, is meshed with the gear 54 of the lock link 50. In the illustrated example, the motor shaft of the power plug unlock motor 55 is parallel to the Y-axis. The power plug unlock motor 55 is, for example, a DC motor. The power plug unlock motor 55 is connected by a harness 57 to a power supply +B of the vehicle 1. When the power plug unlock motor 55 produces rotation, the lock link 50 rotates in a direction opposite to the rotation direction of the power plug unlock motor 55. The power plug unlock motor 55 corresponds to a plug lock drive source.

The electric circuit of the power plug locking device 33 will now be described with reference to FIG. 6. The power plug locking device 33 includes a power supply circuit 58 that supplies the power plug unlock motor 55 with current for unlocking the power plug 19 when unlocking of the vehicle door and the power plug locking device 33 being in a plug lock state are both detected. More specifically, the power supply circuit 58 performs an unlocking operation with the power plug unlocking motor in cooperation with a door unlocking operation only when the power plug locking device 33 is in a plug lock state. When the power plug locking device 33 is not in a plug lock state, the power supply circuit 58 does not actuate the power plug unlocking motor 55.

The power supply circuit 58 includes an unlock relay 59 and a lock relay 60, which are connected to the door lock ECU 13. The unlock relay 59 is activated when the vehicle door is unlocked. The lock relay 60 is activated when the vehicle door is locked. The door lock motor 14 is connected between the relays 59 and 60. In the illustrated example, the door lock motor 14 includes an unlock terminal 14a, which is connected to the unlock relay 59, and a lock terminal, which is connected to the lock relay 60. When the vehicle 1 receives a door lock request signal from the electronic key 6, the door lock ECU 13 deactivates the unlock relay 59, activates the lock relay 60, and produces forward rotation with the door lock motor 14 (door lock operation). When the vehicle 1 receives a door unlock request signal from the electronic key 6, the door lock ECU 13 activates the unlock relay 59, deactivates the lock relay 60, and produces reverse rotation with the door lock motor 14 (door unlock operation).

The power plug unlock motor 55 is connected in parallel to the door lock motor 14. The power plug unlock motor 55 can be connected, for example, to a harness that extends from a power supplying circuit of the door lock motor 14. A plug lock detector 61, which detects whether the power plug locking device 33 is in a plug lock state, and a diode 62, which prevents the flow of reverse current, are connected to the harness between the door lock motor 14 and the power plug unlock motor 55. The plug lock detector 61 is, for example, a micro-switch. When manual operation of the lock button 41 shifts the lock mechanism 40 to a plug lock state, the plug lock detector 61 is mechanically activated. The plug lock detector 61 directly cuts a large current that flows from the door lock motor 14. The diode 62, which prevents the flow of reverse current, is connected between the power plug unlock motor 55 and the plug lock detector 61. The lock button 41 is one example of a manual locking member.

During a door locking operation, current (current Ia in FIG. 6) flows from the lock relay 60 via the door lock motor 14 to the unlock relay 59. Irrespective of whether the plug lock detector 61 is activated or deactivated, the flow of current Ia is stopped by the diode 62. Thus, the current Ia does not flow to the power plug unlock motor 55, and the power plug unlock motor 55 is not actuated. The door lock motor 14 includes a positive terminal and a negative terminal. Among these terminals, the unlock terminal 14a refers to the one that has a high potential when the door lock motor 14 performs a door unlocking operation.

During a door unlocking operation, current (current Ib in FIG. 6) flows from the unlock relay 59 via the door lock motor 14 to the lock relay 60. Due to the current Ib, the voltage at the unlock terminal 14a is a high potential. In this state, when the plug lock detector 61 is activated, current flows to the power plug unlock motor 55 and actuates the power plug locking device 33 (plug unlocking operation).

The operation of the power plug locking device 33 will now be described with reference to FIGS. 7 to 13.

FIGS. 7 and 8 show the power plug locking device 33 in a plug unlock state. Referring to FIG. 7, the lock button 41 is projected out of the case 34 by the urging force of the urging member 43 and located at the initial position. The notch 46 of the lock bar 44 faces the projection 32 (unlock position). Thus, the lock arm 27 is pivotal, and the power plug 19 is removable from the inlet 24.

As shown in FIGS. 8A and 8B, when the lock bar 44 is located at the unlock position, the lock piece 49 is in contact with an inner surface 34a of the case 34 (unlock position). The restriction plate 53 of the lock link 50 is supported by the plate 49b of the lock piece 49. This prohibits rotation of the lock link 50 in the lock direction and holds the power plug locking device 33 in a plug unlock state.

Figure 9:
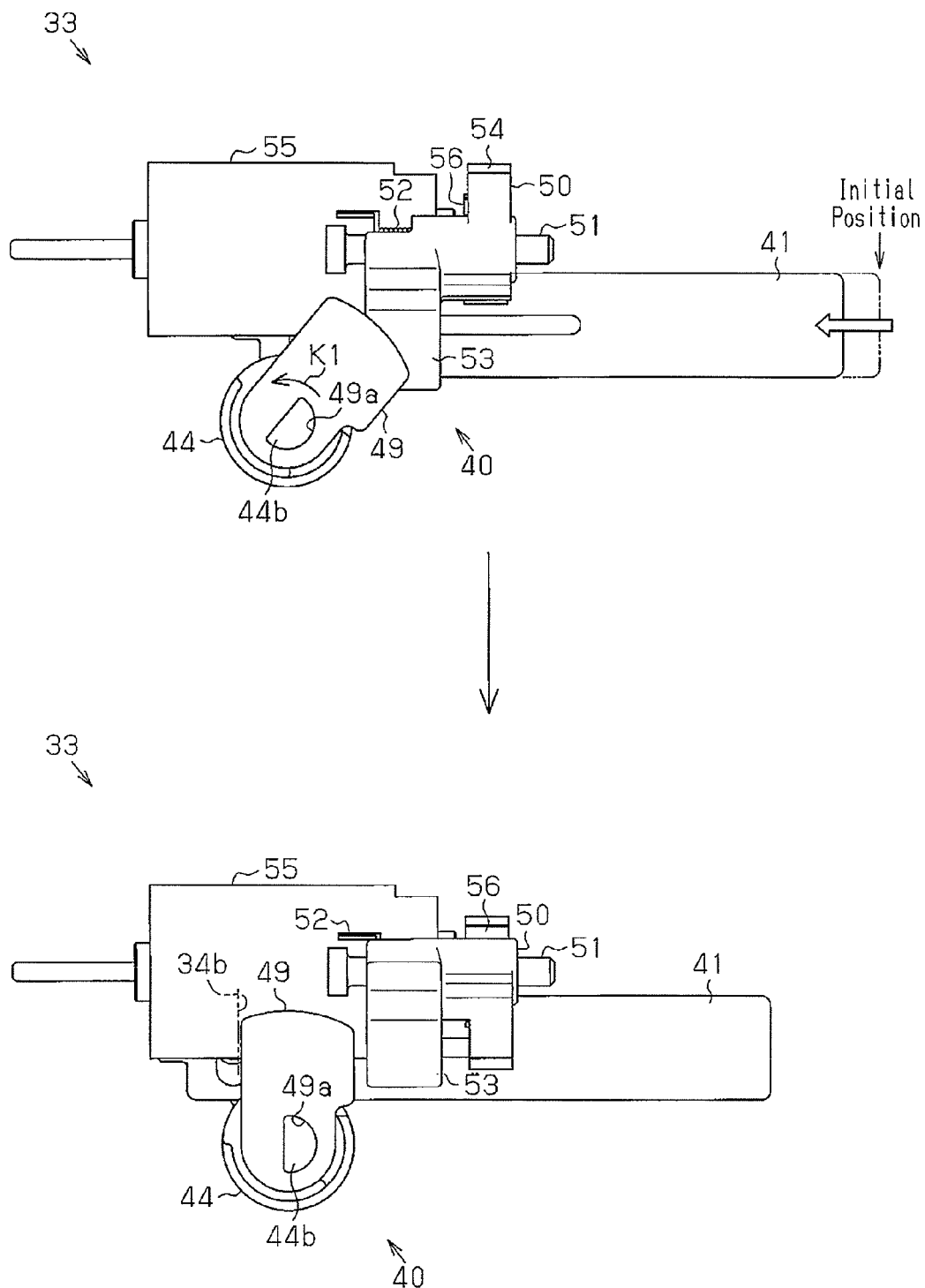
FIG. 9 is a side view showing a lock piece in a state pivoted by a lock button.

Referring to FIG. 9, a user connects the power plug 19 to the inlet 24, pushes the lock button 41 at the initial position, and switches the power plug locking device 33 from the plug unlock state to a plug lock state. As the lock button 41 moves against the urging force of the urging member 43, the lock bar 44 and the lock piece 49 pivot in the lock direction K1.

Figure 10:
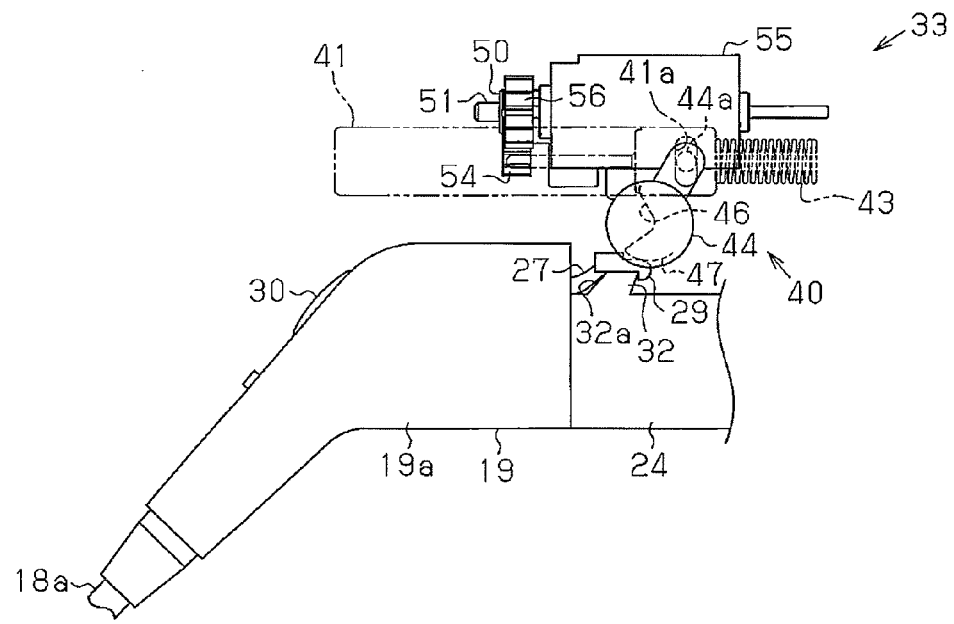
FIG. 10 is a side view showing the power plug locking device in a plug locking state.

Referring to FIG. 10, when the lock button 41 moves from the initial position to the retracted position, the lock bar 44 and the lock piece 49 are rotated by about 60 degrees. When the lock button 41 reaches the retracted position, the lock piece 49 is in contact with the inner surface 34b of the case 34. Here, the circumferential surface 47 of the lock bar 44 faces the projection 32. The circumferential surface 47 of the lock bar 44 prohibits pivoting of the lock arm 27. Thus, the hook 29 of the lock arm 27 cannot be removed from the projection 32, and the power plug locking device 33 locks the power plug 19 to the inlet 24.

Figure 11A:
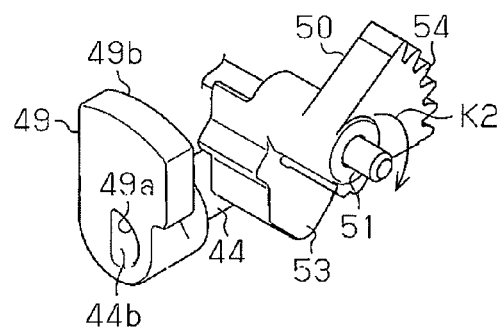
FIG. 11A is a perspective view showing a lock link during unlocking.

Referring to FIG. 11A, when the lock piece 49 is rotated to a lock position, the plate 49b of the lock piece 49 is moved away from the lock link 50. Thus, the urging force of the urging member 52 rotates the lock link 50 in the lock direction K2.

Figure 11B:
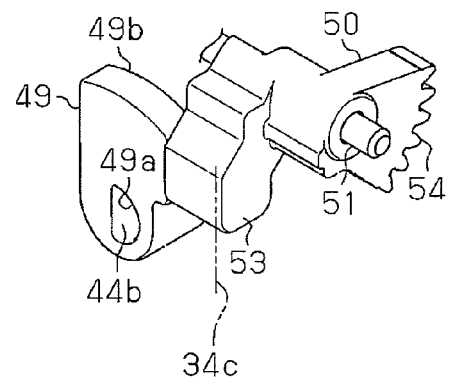
FIG. 11B is a perspective view showing the lock link during locking.

Then, referring to FIG. 11B, the lock link 50 is rotated by about 45 degrees, the restriction plate 53 comes into contact with the inner surface 34c of the case 34, the lock link 50 enters the gap between the lock piece 49 and the case 34, and rotation of the lock piece 49 is prohibited. This maintains the power plug locking device 33 in a plug lock state. When the lock bar 44 reaches a lock position, the plug lock detector 61 is mechanically activated.

Figure 12:
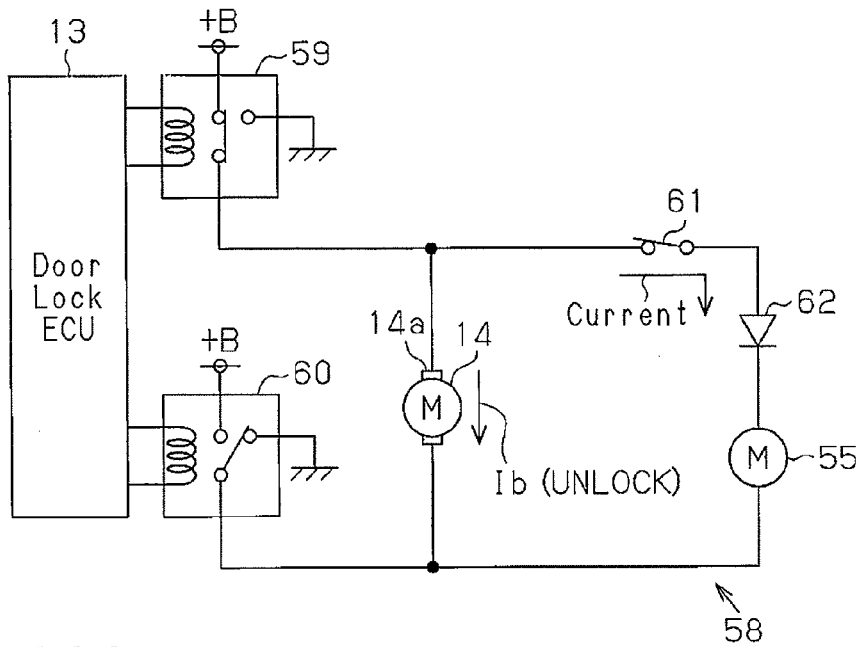
FIG. 12 is a circuit diagram of the power plug locking device when an unlocking operation is performed.

When the power plug locking device 33 is in a plug lock state and a door unlocking operation is performed, the power plug locking device 33 performs an unlock operation in cooperation with the door unlocking operation. Referring to FIG. 12, during the door unlocking operation, current Ib (unlock current) flows to the door lock motor 14, the voltage at the unlock terminal 14a is a high potential, and the plug lock detector 61 is activated. Accordingly, some of the current Ib flows to the power plug unlock motor 55, which produces rotation.

Figure 13A:
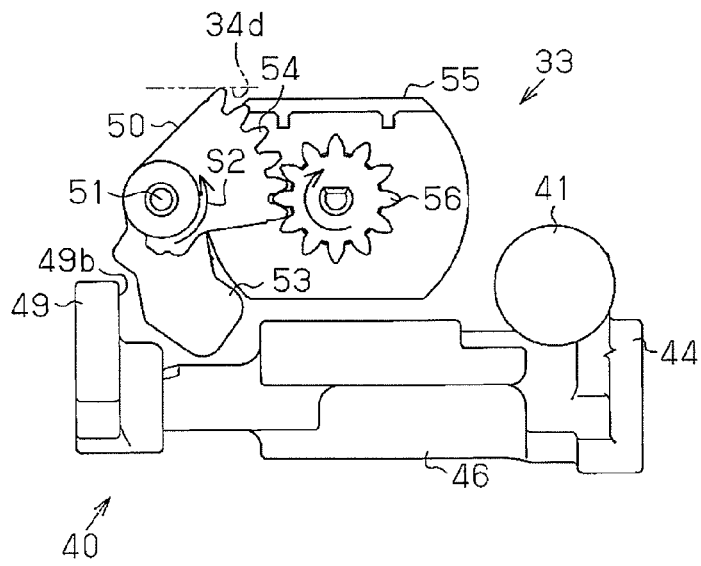
FIG. 13 is a front view showing a lock mechanism when an unlocking operation is started.
Figure 13B:
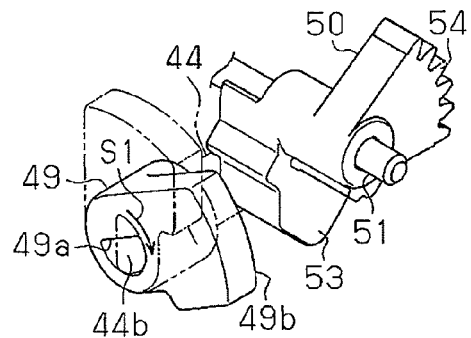

Referring to FIG. 13, the rotation of the power plug unlock motor 55 is transmitted by the gears 54 and 56 to the lock link 50. The lock link 50 is rotated in the unlock direction S2 against the urging force of the urging member 52.

As the lock link 50 rotates in the unlock direction S2 and comes into contact with the inner surface 34d of the case 34, the lock piece 49 is released from the lock link 50. Thus, the lock piece 49 is rotated by the urging force of the urging member 43 in the unlock direction S1 and comes into contact with the inner surface 34a of the case 34. The rotation of the lock piece 49 in the unlock direction S1 rotates the lock bar 44 to the unlock position and returns the lock button 41 to the initial position. This returns the power plug locking device 33 to the plug unlock state.

The power supply circuit 58 includes the plug lock detector 61, which detects whether the power plug locking device 33 is in a plug lock state. The power supply circuit 58 actuates the power plug unlock motor 55 and performs a plug unlocking operation only when a door locking operation and a plug lock state are detected. Thus, when the power plug locking device 33 is already in a plug unlock state, the power plug unlocking motor 55 does not cooperate with the door unlocking operation and remains inactive.

In this manner, the power plug locking device 33 is required to be in a lock state to perform an unlocking operation. Accordingly, the power plug locking device 33, which performs a plug unlocking operation in cooperation with a door unlocking operation, does not perform unnecessary unlocking operations. This extends the duration of the power plug locking device 33.

The power supply circuit 58 is hardware that determines whether the plug lock detector 61 is activated and unlock current Ib is flowing to the door lock motor 14 when supplying the current Ib to the power plug unlock motor 55. Thus, the power supply circuit, which performs the above determination and supplies current, does not have to use expensive electronic components such as an IC. Accordingly, the power plug locking device 33 has a simple structure and is relatively inexpensive.

The present embodiment has the advantages described below.

(1) The power plug locking device 33 includes the power supply circuit 58 that supplies current to the power plug unlocking motor 55 only when the conditions of the door unlocking operation being performed and the power plug locking device 33 being in a plug unlock state are satisfied. When the power plug locking device 33 is in an unlock state, current does not flow to the power plug unlock motor 55. Thus, the power plug locking device 33 does not perform unnecessary unlocking operations. This extends the duration of the power plug locking device 33 that performs a plug unlocking operation in cooperation with a door unlocking operation. Further, the power plug unlock motor 55 is actuated less frequently. This lowers the power consumption of the power plug locking device 33.

(2) The plug lock detector 61, which is arranged in the power supply circuit 58, directly cuts a large current that flows from the door lock motor 14. The plug lock detector 61 and the diode 62 are added to a conventional electric circuit, which includes the power plug unlocking motor 55, to obtain the power supply circuit 58. The power supply circuit 58 has a relatively small number of components. Thus, the power plug locking device 33 has a relatively simple structure.

Second Embodiment

A second embodiment of the present invention will now be described with reference to FIGS. 14 and 15. Only the differences from the first embodiment will be described in detail.

Figures 14, 15:
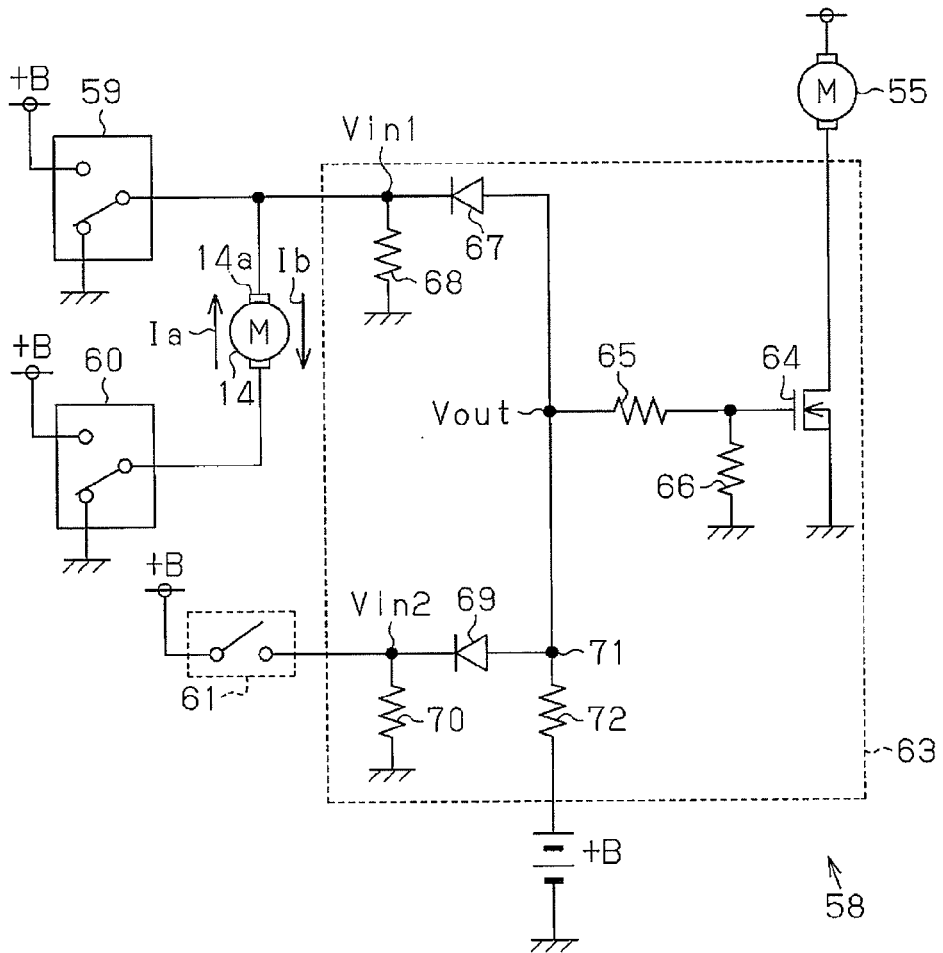
FIG. 14 is a circuit diagram of a power plug locking device according to a second embodiment of the present invention.
FIG. 15 is a chart showing the operation of the power plug locking device.

As shown in FIG. 14, the power supply circuit 58 includes an AND circuit 63. The AND circuit 63 includes an input terminals, which is connected to the unlock relay 59 and the plug lock detector 61, and an output terminal, which is connected to the motor 55. The AND circuit 63 supplies the motor 55 with drive current from the output terminal. The AND circuit 63 includes a switching element, which is connected to a ground terminal of the power plug unlock motor 55. In accordance with the two inputs from the unlock relay 59 and the plug lock detector 61, the switching element 64 starts and stops the supply of current to the power plug unlock motor 55. The switching element 64 is, for example, a field effect transistor (FET). The AND circuit 63 or switching element 64 is one example of a switch circuit.

The gate terminal of the switching element 64 is AND-connected to the unlock terminal 14a of the door lock motor 14 and the plug lock detector 61. More specifically, the gate terminal of the switching element 64 is connected to voltage regulation resistors 65 and 66, which are connected in a T-shaped manner. The resistor 65 is connected to the unlock terminal 14a and the plug lock detector 61. A diode 67 and a resistor 68, which are connected in a T-shaped manner, are connected between the unlock terminal 14a and the resistor 65. A diode 69 and a resistor 70, which are connected in a T-shaped manner, are connected between the plug lock detector 61 and the resistor 65. The unlock terminal 14a and the plug lock detector 61 are AND-connected to a node 71, which is connected by a resistor 72 to the power supply +B.

The operation of the power plug locking device 33 will now be described with reference to FIG. 15. The voltage at the unlock terminal 14a of the door lock motor 14 is represented by Vin1. The voltage at the output terminal of the plug lock detector 61 is represented by Vin2. The AND output of Vin1 and Vin2 is represented by Vout.

During a door locking operation, lock current Ia flows to the door lock motor 14, and the voltage Vin has a low level. Thus, regardless of the voltage Vin2, the output Vout has a low level. This deactivates the switching element 64, and drive current does not flow to the power plug unlock motor 55. Accordingly, the power plug unlock motor 55 is not actuated.

During a door unlocking operation, unlocking current Ib flows to the door lock motor 14, and the voltage Vin has a high level. If the power plug locking device 33 is in a plug lock state, the plug lock detector 61 is activated, and the voltage Vin2 has a high level. Thus, the output Vout has a high level, and the switching element 64 is actuated. Accordingly, the power plug unlock motor 55 is supplied with drive current and performs an unlock operation.

During a door unlocking operation, if the power plug locking device 33 is in a plug unlock state, that is, when the plug lock detector 61 is deactivated, the voltage Vin2 has a low level. As a result, the output Vout has a low level, the switching element 64 is deactivated, the power plug unlock motor 55 is not supplied with drive current, and the power plug locking device 33 is not actuated. In this manner, as long as the power plug locking device 33 is in a plug unlock state, the power plug unlock motor 55 does not cooperate with the door unlocking operation and remains inactive.

When the door locking device 9 is inactive, the door lock motor 14 is not supplied with current, and the voltage Vin1 has a low level. Thus, irrespective of the voltage Vin2, the output Vout has a low level, and the switching element 64 is deactivated. In this state, the power plug unlock motor 55 is not supplied with drive current and not actuated.

In addition to advantage (1) of the first embodiment, the second embodiment has the following advantage.

(3) A large current that drives the door lock motor 14 does not flow to the AND circuit 63. This allows for the use of the plug lock detector 61 and diodes 67 and 69 that are for small currents. The plug lock detector 61 and diodes 67 and 69 are small. This reduces the size and cost of the power plug locking device 33.

Third Embodiment

A third embodiment of the present invention will now be described with reference to FIGS. 16 to 18. Only the differences from the first and second embodiments will be described in detail.

Figure 16:
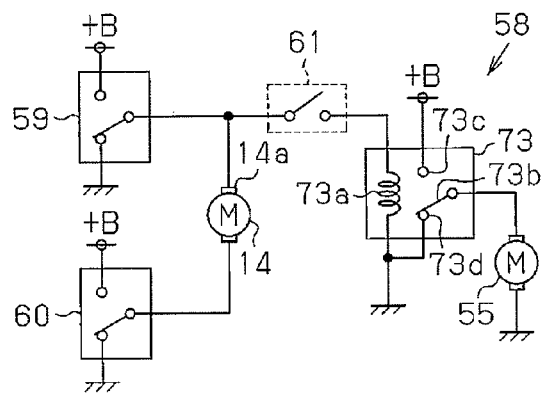
FIG. 16 is a circuit diagram of a power plug locking device according to a third embodiment of the present invention.

As shown in FIG. 16, the power supply circuit 58 includes a relay 73, which is connected between the power plug unlock motor 55 and the plug lock detector 61. The relay 73 may be a form-C contact or transfer contact. A coil 73*a* is connected between the plug lock detector 61 and ground. A movable contact 73*b* is connected to the power plug unlock motor 55. Fixed terminals 73*c* and 73*d* are respectively connected to the power supply +B and ground. Only small current flows to the plug lock detector 61. Thus, the plug lock detector 61 may be, for example, a micro-switch. The relay 73 is one example of a switch circuit.

Figure 17A:
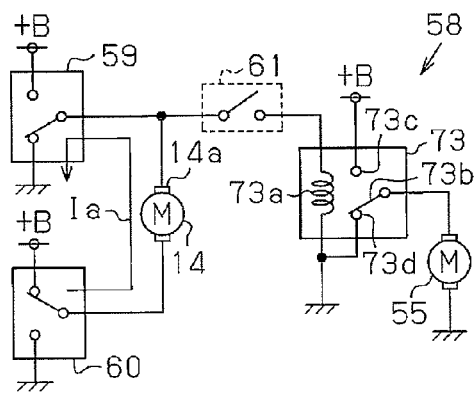
FIG. 17A is a circuit diagram showing a state in which door locking is performed in a plug unlock state.
Figure 17B:
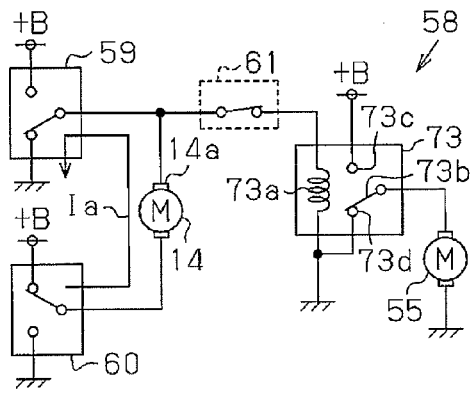
FIG. 17B is a circuit diagram showing a state in which door locking is performed in a plug lock state.

Referring to FIGS. 17A and 17B, during a door locking operation, the unlock terminal 14*a* of the door lock motor 14 is directly connected to ground, and the voltage at the unlock terminal 14*a* is low. Thus, irrespective of the voltage at the plug lock detector 61, the current flowing to the door lock motor 14 does not flow to the coil 73*a* of the relay 73. As a result, the power plug unlock motor 55 is not actuated.

Figure 18A:
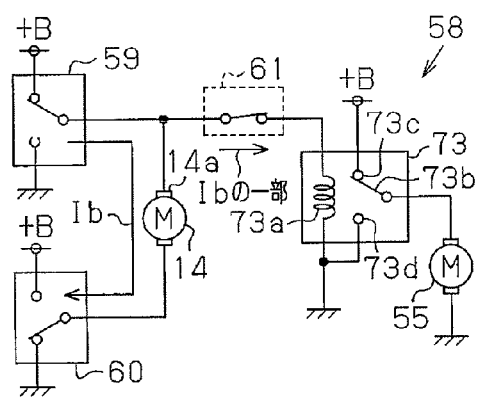
FIG. 18A is a circuit diagram showing a state in which door unlocking is performed in a plug lock state.

Referring to FIG. 18A, during a door unlocking operation, unlock current Ib flows to the door lock motor 14, and the voltage at the unlock terminal 14*a* of the door lock motor 14 is a high potential. When the power plug locking device 33 is in a plug lock state, the plug lock detector 61 is activated. Thus, some of the unlock current Ib flows to the coil 73*a* of the relay 73 and activates the relay 73. As a result, the power plug unlocking motor 55 performs an unlocking operation.

Figure 18B:
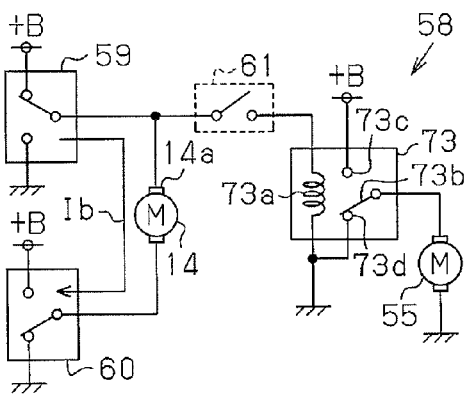
FIG. 18B is a circuit diagram showing a state in which door unlocking is performed in a plug unlock state.

Referring to FIG. 18B, when the power plug locking device 33 is in a plug unlock state, the plug lock detector 61 is deactivated, and the unlock current Ib flowing to the door lock motor 14 does not flow to the coil 73*a* of the relay 73. Thus, the relay 73 remains deactivated, and the power plug unlock motor 55 is not actuated.

In addition to advantage (1) of the first embodiment, the present embodiment has the advantages described below.

(4) The relay 73 is switched by a small current. Thus, only small current flows to the plug lock detector 61, which is connected between the relay 73 and the door lock motor 14. As a result, the plug lock detector 61 may be small. This reduces the size and cost of the power plug locking device 33.

(5) Two components in the power supply circuit 58, namely, the plug lock detector 61 and the relay 73, are relatively small and inexpensive. This reduces the size and cost of the power plug locking device 33.

Fourth Embodiment

Figure 19:
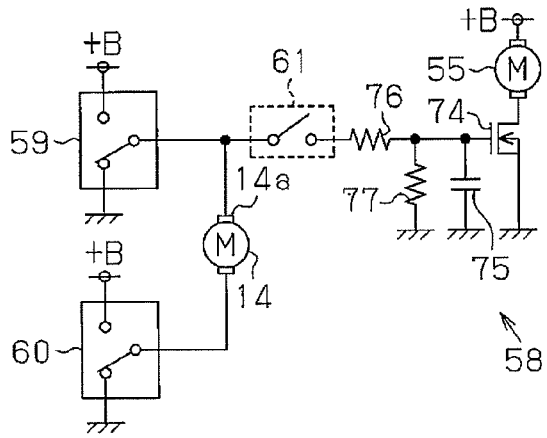
FIG. 19 is a circuit diagram of a power plug locking device according to a fourth embodiment of the present invention.

A fourth embodiment of the present invention will now be described with reference to FIGS. 19 to 21. Only the differences from the first to third embodiments will be described in detail.

Figure 21A:
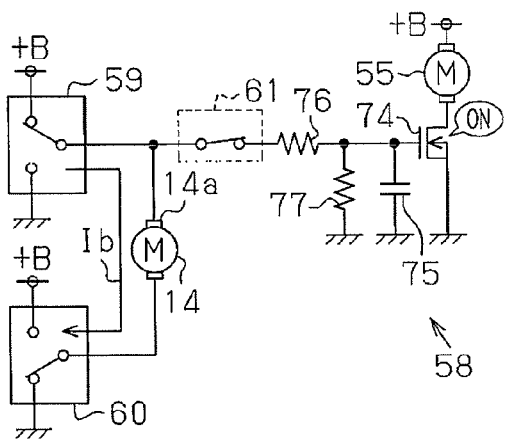
FIG. 21A is a circuit diagram showing a state in which door unlocking is performed in a plug lock state.
Figure 21B:
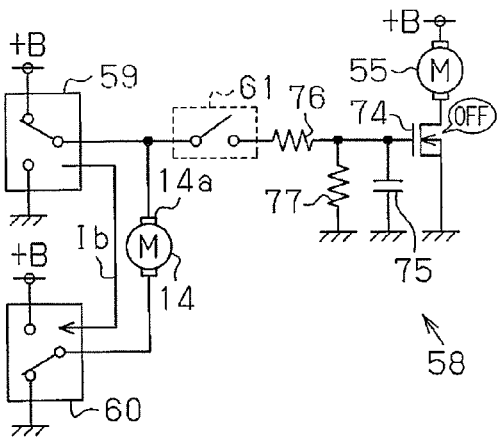
FIG. 21B is a circuit diagram showing a state in which door unlocking is performed in a plug unlock state.

Referring to FIG. 21, the power supply circuit 58 includes a switching element 74 connected between the ground terminal of the power plug unlock motor 55 and the plug lock detector 61. The switching element 74 is, for example, an FET. The switching element 74 is one example of a switch circuit.

The gate terminal of the switching element 74 is connected to the plug lock detector 61 via a capacitor 75, which eliminates noise, and resistors 76 and 77, which are connected in a T-shaped manner. Only small current flows to the plug lock detector 61. Thus, the plug lock detector 61 may be, for example, a micro-switch.

Figure 20A:
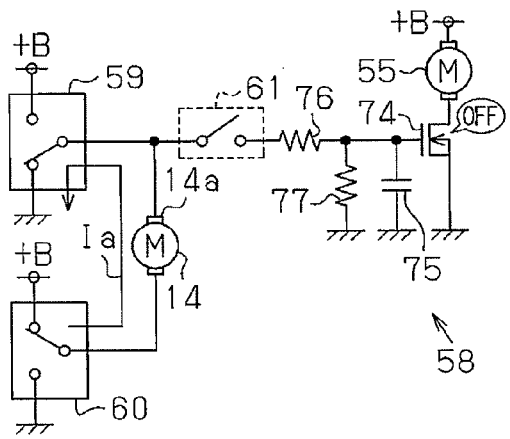
FIG. 20A is a circuit diagram showing a state in which door locking is performed in a plug unlock state.
Figure 20B:
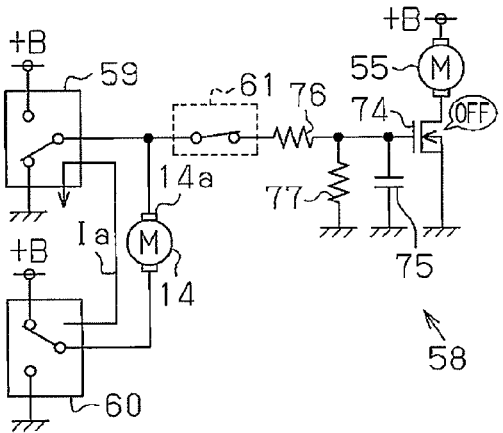
FIG. 20B is a circuit diagram showing a state in which door locking is performed in a plug lock state.

Referring to FIGS. 20A and 20B, during a door locking operation, the voltage at the unlock terminal 14*a* of the door lock motor 14 is a low potential. Thus, irrespective of the voltage at the plug lock detector 61, the gate-source voltage of the switching element 74 is a low potential. As a result, the switching element 74 is deactivated, and the power plug unlock motor 55 is not actuated.

During a door unlocking operation, when the plug lock detector 61 is activated, as shown in the state of FIG. 21A, the gate-source voltage of the switching element 74 becomes a high potential. As a result, the switching element 74 is activated, and the power plug unlock motor 55 performs an unlocking operation.

In addition to advantage (1) of the first embodiment, the present embodiment has the following advantage.

(6) A large current does not flow between the switching element 74 and the door lock motor 14. Thus, the plug lock detector 61 may be one that is applied for small currents and be relatively small. As a result, the power plug locking device 33 is compact and inexpensive. Further, the power supply circuit 58 has a simple structure that uses only an FET, switches, a capacitor, and resistors.

Fifth Embodiment

A fifth embodiment of the present invention will now be described with reference to FIGS. 22 and 23. Only the differences from the first to fourth embodiments will be described in detail.

Figure 22A:
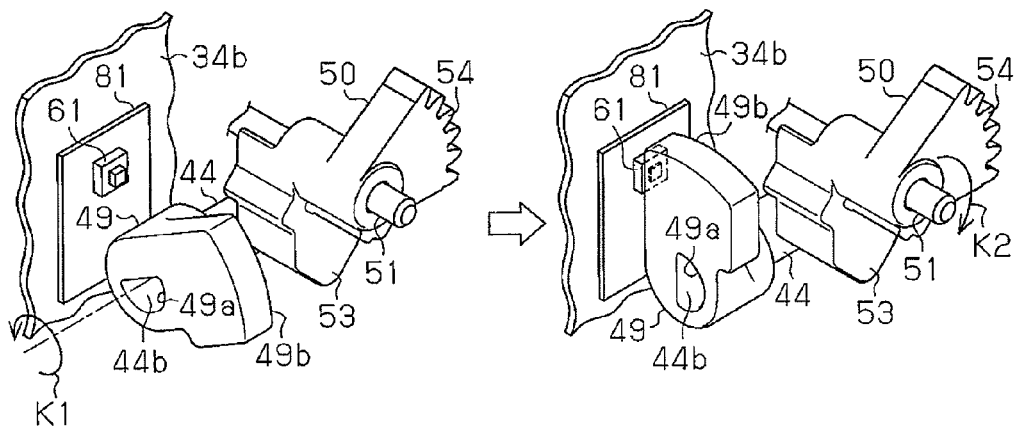
FIGS. 22A and 22B are perspective views showing examples of a plug lock detector in a fifth embodiment.
Figure 22B:
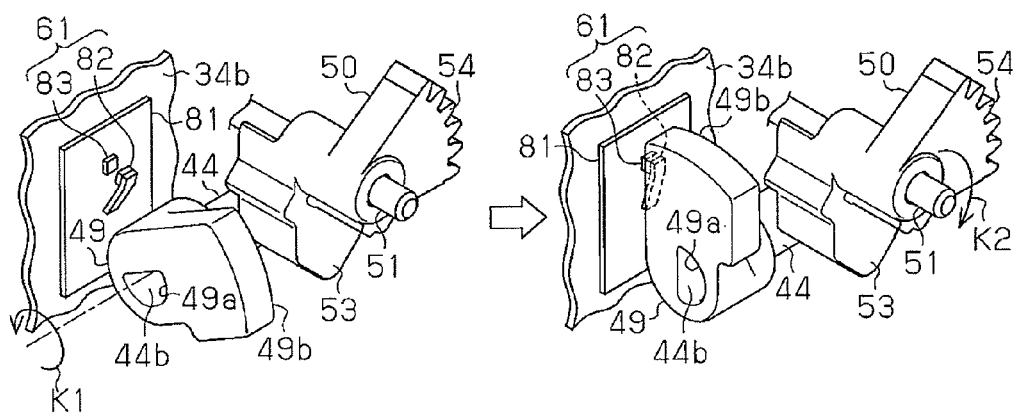

In the examples shown in FIGS. 22A and 22B, the plug lock detector 61 is arranged on a circuit substrate 81, which is accommodated in the case 34. The circuit substrate 81 is connected to various devices by the harness 57, which extends from the power plug unlock motor 55. The circuit substrate 81 is arranged in the vicinity of the lock piece 49. When the lock piece 49 is pivoted in the lock direction K1, the lock piece 49 physically contacts the plug lock detector 61 on the circuit substrate 81. The case 34 corresponds to a device body. The circuit substrate 81 is included in a circuit unit.

For example, the plug lock detector 61 of FIG. 22A is a single switch unit. The switch unit is arranged on the circuit substrate 81. When the lock button 41 is pushed and the lock piece 49 is pivoted in the lock direction K1, the lock piece 49 physically pushes a movable contact of the switch unit and activates the switch unit. In this manner, the plug lock detector 61 is formed by a switch unit arranged on the circuit substrate 81, which is a circuit unit, and uses the rotation of the lock piece 49 to detect a plug lock state.

The plug lock detector 61 of FIG. 22B includes a movable contact 82 and a fixed contact 83, which are arranged on the circuit substrate 81. When the lock button 41 is pushed and the lock piece 49 is pivoted in the lock direction K1, the movable contact 82 is physically pushed by the lock piece 49 and comes into contact with the fixed contact 83. In this manner, the plug lock detector 61 includes the fixed contact 83, which is arranged on the circuit substrate 81, and the movable contact 82, which is arranged on the lock piece 49 that is a mechanical component, to detect a plug lock state from the rotation of the lock piece 49.

Figure 23A:
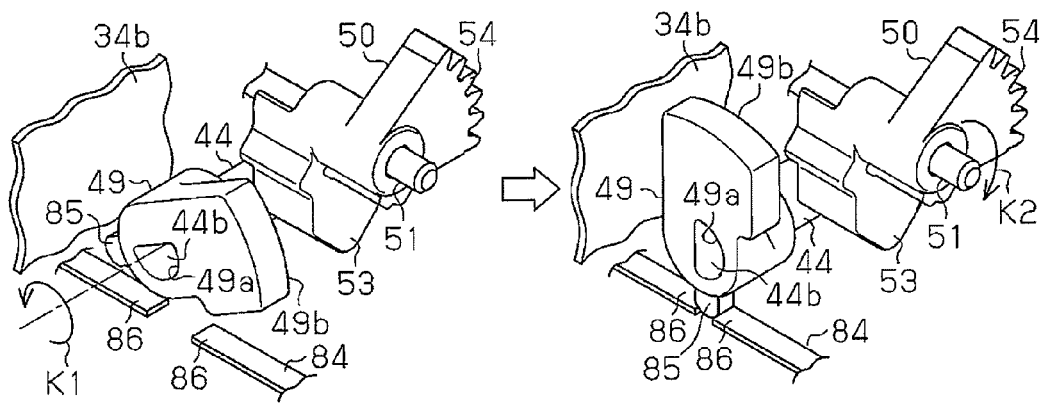
FIGS. 23A and 23B are perspective views showing other examples of the plug lock detector.
Figure 23B:
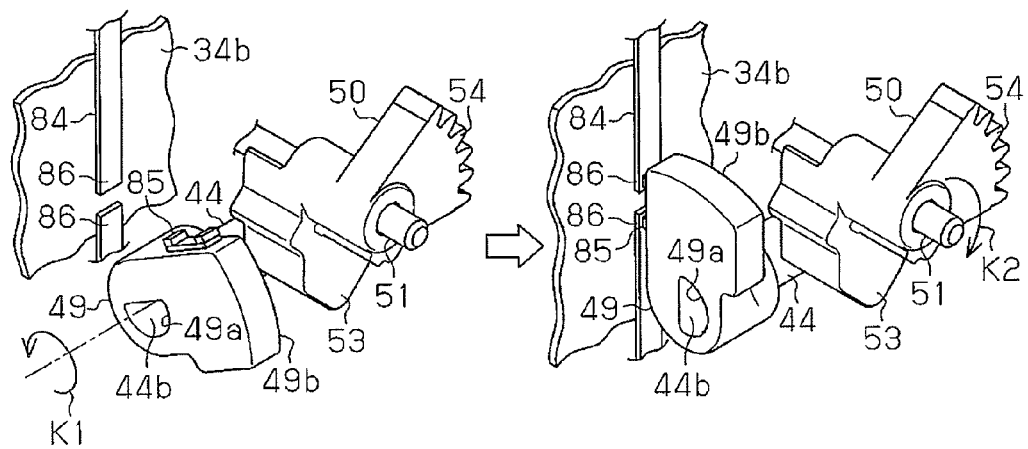

FIG. 23 shows a plug lock detector formed by a bus bar 84 and the lock piece 49, which are accommodated in the case 34. The bus bar 84 is a wire that electrically connects, for example, the vehicle power supply +B and the power plug unlock motor 55. The bus bar 84 is included in the circuit unit.

In the example shown in FIG. 23A, the plug lock detector includes a movable contact 85, which is fixed to the lock piece 49, and two fixed contacts 86, which are two separated ends of the bus bar 84. When the lock button 41 is pushed and the lock piece 49 is pivoted in the lock direction K1, the movable contact 85 connects the fixed contacts 86. This closes the bus bar 84. In this manner, the plug lock detector includes the bus bar 84, which is a circuit unit, and the movable contact 85, which is arranged on the lock piece 49 that is a mechanical component, to detect a plug lock state from the rotation of the lock piece 49.

In addition to advantages (1) to (6) of the above embodiments, the present embodiment has the advantages described below.

(7) The plug lock detector of the fifth embodiment includes the circuit substrate 81 or the bus bar 84, which are arranged in the power plug locking device 33. When the plug lock detector 61 is arranged at a remote position separated from the circuit substrate 81 or the bus bar 84, a conduction path is required to connect the plug lock detector with the circuit substrate 81 or the bus bar 84. However, the fifth embodiment eliminates the need for such a conduction path. Thus, the power plug locking device 33 can be reduced in size.

(8) The lock piece 49 has less rotation play and manufacturing error than the lock link 50. Since the plug lock detector uses the rotation of the lock piece 49 to detect a plug lock state, variations in the detection accuracy can be suppressed.

It should be apparent to those skilled in the art that the present invention may be embodied in many other specific forms without departing from the spirit or scope of the invention. Particularly, it should be understood that the present invention may be embodied in the following forms.

The conditions for starting the charging of the battery 5 can be changed. For example, charging may be started when the plug connection detection sensor 25 detects that the power plug 19 has been fitted to the inlet 24 and that ID verification of the electronic key 6 has been satisfied.

The power plug locking device 33 may include a structure for manually switching a plug lock state to a plug unlock state.

A switch dedicated for stopping the charging of the battery 5 may be arranged in the vehicle.

The electronic key system 7 is not limited to a wireless key system. For example, the electronic key system 7 may be a key-operation-free system that performs ID verification when communication with the vehicle starts or a near field wireless authentication system that complies with any of various near field communication (NFC) standards.

The wireless key system may be an automatic slide door system.

The wireless key system may alternately lock and unlock a door whenever a single button 16 of the electronic key 6 is operated.

The lock mechanism 40 may have any structure as long as it is can be manually switched to and held in a lock state.

In the above embodiment, the locking member is not limited to the lock member, which solely moves to above the lock arm 27 to enter a lock state, and may be formed by a plurality of components. For example, the lock bar 44 may restrict pivoting of the lock arm 27 with a predetermined member.

In the above embodiments, the door lock drive source and plug lock drive source are not limited to motors and may be, for example, solenoids.

In the above embodiments, the plug lock detector 61 is not limited to a switch (micro-switch) and may be, for example, a sensor. In other words, the plug lock detector 61 is not limited to a contact type switch and may be a non-contact type sensor such as a magnetic sensor or an optical sensor.

In the above embodiments, the switch circuits are not limited to FETs or relays and may be other types of switches.

In the above embodiments, the vehicle 1 is not limited to a hybrid vehicle and may be an electric vehicle that is driven by just a motor.

In the above embodiment, the power plug locking device 33 is applied to the vehicle 1 but may be applied to other devices.

In the above embodiment, the power supply circuit 58 may be, for example, an integrated circuit (IC).

In the fifth embodiment, the sliding and opposing contact structures shown in FIG. 23 does not have to be used with the bus 84 and may be used with, for example, the circuit substrate 81. That is, the structures of the fifth embodiment may be combined as required. For example, the circuit substrate 81 and the bus bar 84 may both be included in the circuit unit. In this case, the circuit substrate 81 may include various components of the power plug locking device 33 and the bus bar 84 may include a switch. Alternatively, this combination may be reversed.

In the fifth embodiment, the circuit unit is not limited to the circuit substrate 81 and the bus bar 84, which are connected to electronic components of the power plug locking device 33. For example, the circuit unit may be electronic components of the power plug locking device 33 other than the circuit substrate 81 and the bus bar 84.

The present examples and embodiments are to be considered as illustrative and not restrictive, and the invention is not to be limited to the details given herein, but may be modified within the scope and equivalence of the appended claims.

The invention claimed is:

1. A power plug locking device for use with a door lock drive source that locks a door of a vehicle, the power plug locking device comprises:
   a lock mechanism switched between a lock state, in which the lock mechanism prohibits removal of a power plug from an inlet, and an unlock state, in which the lock mechanism permits removal of the power plug from the inlet;
   a plug lock drive source that performs at least an unlocking operation that switches the lock mechanism from the lock state to the unlock state;
   a plug lock detector that detects whether or not the lock mechanism is in the lock state, wherein the plug lock detector is connected between the plug lock drive source and an unlock terminal, which has a high potential when the door is unlocked and which is one of a plurality of terminals of the door lock drive source; and a power supply circuit that supplies the plug lock drive source with current and switches the lock mechanism from the lock state to the unlock state only when the door lock drive source is performing an unlocking operation while the plug lock detector is detecting that the lock mechanism is in the lock state.

2. The power plug locking device according to claim 1, wherein
the plug lock drive source is connected in parallel to the door lock drive source,
the plug lock detector is arranged between the plug lock drive source and the unlock terminal of the door lock drive source, and
when the door lock drive source is performing the unlock operation, the power supply circuit supplies the plug lock drive source with some of a current flowing through the door lock drive source via the plug lock detector to switch the lock mechanism to the unlock state.

3. The power plug locking device according to claim 1, wherein
the power supply circuit includes a switch circuit connected between the plug lock drive source, which is connected to the unlock terminal, and the plug lock detector, and
when the door lock drive source is performing the unlock operation while the plug lock detector is detecting that the lock mechanism is in the lock state, the switch circuit is activated and the plug lock drive source is supplied with a drive current to switch the lock mechanism to the unlock state.

4. The power plug locking device according to claim 3, wherein
the switch circuit includes an AND circuit,
the AND circuit includes input terminals, which are connected to the unlock terminal and the plug lock detector, and an output terminal, which supplies the plug lock drive source with the drive current, and
the AND circuit includes a switching element that is activated and deactivated in accordance with outputs from the unlock terminal and the plug lock detector.

5. The power plug locking device according to claim 3, wherein the switch circuit includes a relay that is activated and deactivated in accordance with a current supplied from the unlock terminal via the plug lock detector.

6. The power plug locking device according to claim 3, wherein the switch circuit includes a switching element activated and deactivated in accordance with voltage supplied from the unlock terminal via the plug lock detector.

7. The power plug locking device according to claim 1, further comprising:
a device body;
a plurality of electric components arranged in the device body; and
a circuit unit connected to the electric components, wherein the plug lock detector is arranged in at least the circuit unit.

8. The power plug locking device according to claim 1, wherein the lock mechanism is manually switched to the lock state.

9. The power plug locking device according to claim 7, wherein the plug lock detector includes a circuit unit connected to the electric components and mechanical components of the lock mechanism.

10. The power plug locking device according to claim 7, wherein the plug lock detector includes a fixed contact, which is formed in the circuit unit connected to the electric components, and a movable contact, which is arranged in a movable component of the lock mechanism.

11. A power plug locking device that functions in a plug lock state, in which the power plug locking device prohibits removal of a power plug from an inlet, and a plug unlock state, in which the power plug locking device permits removal of the power plug from the inlet, wherein the power plug locking device is used with a door lock motor and performs a door locking operation when supplied with a lock current and a door unlocking operation when supplied with an unlock current, the power plug locking device comprising:
a relay connected to the door lock motor, wherein the relay switches the lock current and the unlock current;
a plug unlock motor connected in parallel to the door lock motor, wherein the plug unlock motor performs a plug unlocking operation in cooperation with the door unlocking operation of the door lock motor; and
a switch arranged between the relay and the plug unlock motor, wherein the switch starts and stops supplying the unlock current from the relay to the plug unlock motor, wherein the switch is activated in the plug lock state to supply the unlock current to the plug unlock motor and deactivated in the plug unlock state to stop supplying the unlock current to the plug unlock motor.

12. A power plug locking device that functions in a plug lock state, in which the power plug locking device prohibits removal of a power plug from an inlet, and a plug unlock state, in which the power plug locking device permits removal of the power plug from the inlet, wherein the power plug locking device is used with a door lock motor and performs a door locking operation when supplied with a lock current and a door unlocking operation when supplied with an unlock current, the power plug locking device comprising:
a plug unlock motor that performs a plug unlocking operation when supplied with a drive current that differs from the lock current and the unlock current;
a relay connected to the door lock motor, wherein the relay switches the lock current and the unlock current;
a switch activated in the plug lock state and deactivated in the plug unlock state; and
an AND circuit including input terminals, which are connected to the switch and a node between the relay and the door lock motor, and an output terminal, which is connected to the plug unlock motor, wherein the AND circuit supplies the drive current to the plug unlock motor from the output terminal when the unlock current is supplied to the door lock motor in the plug lock state and otherwise supplies the drive current to the plug unlock motor from the output terminal.

13. A power plug locking device that functions in a plug lock state, in which the power plug locking device prohibits removal of a power plug from an inlet, and a plug unlock state, in which the power plug locking device permits removal of the power plug from the inlet, wherein the power plug locking device is used with a door lock motor and performs a door locking operation when supplied with a lock current and a door unlocking operation when supplied with an unlock current, the power plug locking device comprising:
a plug unlock motor that performs a plug unlocking operation when supplied with a drive current that differs from the lock current and the unlock current;
a relay connected to the door lock motor, wherein the relay switches the lock current and the unlock current;
a switch activated in the plug lock state and deactivated in the plug unlock state, wherein the switch is connected to a node between the relay and the door lock motor; and a switch circuit including an input terminal, which is connected to the switch, and an output terminal, which is connected to the plug unlock motor, wherein the switch circuit supplies the drive current to the plug unlock motor from the output terminal when the unlock current is supplied to the door lock motor in the plug lock state and otherwise supplies the drive current to the plug unlock motor from the output terminal.

* * * * *